United States Patent Office 3,009,242
Patented Nov. 21, 1961

3,009,242
ZIRCONIUM-CLADDING OF THORIUM
Richard J. Beaver, Knoxville, Tenn., assignor to the United States of America as represented by the United States Atomic Energy Commission
No Drawing. Filed Jan. 3, 1958, Ser. No. 707,070
10 Claims. (Cl. 29—470)

My invention relates generally to the neutronic reactor art and more particularly to a method of bonding zirconium to thorium.

Thorium has been recognized for some time as a potential source of fissionable fuel, since it is a fertile material capable of being converted to a fissionable fuel by reaction with neutrons. Thorium–232 undergoes a reaction with a neutron to form thorium–233, which decays by beta emission to the fissionable W–233 isotope. Reference is made to The Reactor Handbook, Vol. 3, AECD—3647, March 1955, wherein there appears, on pages 299–345, a general discussion of thorium and its alloys.

Thorium, in the metallic state, is reactive with many commonly encountered materials and, as a consequence, must be protected by a more inert material in order to utilize its fertility in neutronic reactors. Since zirconium has desirable nuclear, chemical, and metallurgical properties, it has been a substance of interest to neutronic reactor designers and a great amount of effort has been expended to develop this material for neutronic reactor use.

Many reactor materials have been protected by roll-cladding with relatively inert materials, and thorium and zirconium have been found to form a roll-clad bond under the proper conditions. However, the combination of zirconium and thorium, heretofore, has been encumbered by the reactive properties of its components. Both zirconium and thorium absorb gases readily. Surface oxidation on zirconium has been observed at relatively low temperatures (300° C.) but the rate of oxidation does not become significant until much higher temperatures are reached. Thorium oxidizes readily upon exposure to the ambient atmosphere at room temperature. Zirconium and thorium will bond, by hot rolling, only if the bonding surfaces are free from oxide contamination; therefore, in the prior art, all roll cladding of thorium with zirconium has been accomplished only by resort to a vacuum. The well-known "picture frame" technique has been used for this purpose. Heretofore, the thorium and the zirconium "picture frame" cladding materials have been enclosed in a centrally apertured steel frame, provided with exhaust tubes to evacuate the assembly, and by steel cover sheets welded to the frame. The entire assembly, including the steel enclosure, after evacuation and sealing, is then rolled at high temperatures in order to form a bond between the zirconium and thorium. The disadvantages of this process are twofold: The weldments required to close the enclosure are susceptible to fracture and outgassing and maintenance of a suitable vacuum is difficult. Consequently, this method has not been completely satisfactory, and there has long been a need for a procedure which will produce more uniform bonding of zirconium to thorium.

It is, therefore, an object of my invention to provide an improved method of bonding thorium and zirconium whereby bond imperfections are eliminated.

Another object of my invention is to provide an improved method of bonding thorium with zirconium, whereby the resultant composite can be mechanically processed in air.

Another object of my invention is to eliminate the necessity of encapsulating thorium-zirconium composites in order to achieve a sound thorium-zirconium bond.

These and other objects of my invention will become apparent from the following detailed description of my invention when read in conjunction with the appended claims.

In accordance with the principles of my invention, I provide a novel method of bonding zirconium to thorium, which comprises incorporating a coating of a thorium-zirconium alloy between the surfaces to be bonded, heating the article in a vacuum to melt the alloy and cooling the resultant article, whereby a sound bond is formed. The resultant article may be subsequently rolled, extruded, drawn or generally mechanically processed in air without deleterious effects to the formed bond.

My method of forming a thorium-zirconium bond is, however, particularly advantageous when used in the manufacture of composite hermetically-sealed zirconium-thorium plates having a further zirconium cladding for neutronic reactor service. Zirconium-zirconium bonds are more readily formed by means of rolling than are thorium-zirconium bonds; therefore, I have found that, utilizing canning technique, composite plates may readily be produced by rolling a further cladding of zirconium onto the article resulting from the initial bonding of zirconium to thorium as described above. When incorporated into the rolling process, the initial bond is formed by means of the alloy as described above and the product thereof is encapsulated between additional zirconium cover sheets and a centrally apertured zirconium frame. The resultant article is then enclosed in steel and rolled to produce a sound zirconium-zirconium bond, which enclosure is subsequently removed to yield a zirconium-clad thorium product.

The enclosing and subsequent rolling may be accomplished by prior art methods. In one such method a centrally apertured steel frame, the central aperture being large enough to accept the preclad thorium article together with its zirconium picture frame, is fabricated from Ti-namel, which is a commercially available, low carbon and highly deoxidized grade of enameling iron. An exhaust tube is provided in the frame so that the interior can be evacuated. Two Ti-namel cover sheets are then welded to the frame, using standard welding techniques, thereby enclosing the zirconium-framed thorium article. After evacuation of the welded assembly and sealing of the exhaust tube by hot forging, the entire assembly including the steel enclosure is rolled at temperatures between 650–850° C. with a total reduction in thickness of 8 to 1. After rolling, the steel enclosure is cut open whereupon it disengages easily from the zirconium cladding leaving the thorium hermetically sealed therewithin.

Generally, any thorium-zirconium alloy which melts below the melting point of zirconium is suitable for use in the method which I provide, but it is preferred that alloys which melt at temperatures below 1400° C. are used. Alloys containing more than 70 weight percent but less than 80 weight percent thorium melt at temperatures below 1400° C. Within the preferred range, the eutectic composition containing 78 weight percent thorium is particularly preferred as will be evident from the example below.

The alloy coating can be incorporated between the surfaces to be bonded in any convenient form. However, I have found it preferable, in order to maintain uniformity of strength in the bond, to use the alloy in the form of a very thin sheet or foil. Thorium-zirconium sheets or foils can be prepared by hot-rolling an arc-melted thorium billet to an intermediate thickness and cold rolling to a final desired thickness. Foils having thicknesses between 0.005 inch to 0.03 inch are suitable, but it is preferable to use foils having a thickness of approximately 0.010 inch. At least all major surfaces should be coated but the edges of a plate may suitably be left uncoated and clad subsequently by prior art methods.

The term "vacuum" as used herein is defined as an absolute pressure lower than $1 \times 10^{-4}$ mm. of Hg.

The temperature to which the composite article is heated under vacuum is determined by the melting point of the alloy which is used. Generally, any temperature higher than the melting point of the incorporated alloy but lower than the melting point of zirconium is satisfactory to achieve a sound bond upon cooling, but it is preferred that the temperature be raised only to or slightly above the melting point of the alloy. This temperature is 1300° C. in the case of the preferred eutectic composition containing 78% thorium.

The following examples are offered as illustrative of one manner in which my invention may be practiced.

*Example I*

A thorium billet 2 inches wide, 2 inches long and 0.8 inch thick and two zirconium cover sheets 2 inches by 2 inches by 0.10 inch were assembled in air incorporating a 2 inch by 2 inch by 0.010 inch piece of 78% thorium-22% zirconium eutectic brazing foil between each of the two thorium-zirconium mating surfaces. The assembly was placed in a bell-jar, which was evacuated to a pressure of $5 \times 10^{-5}$ mm. Hg, and heated by an induction heater to a temperature sufficient to melt the brazing foil (1300° C.). Upon cooling, the brazed assembly was removed from the bell-jar. A metallographic examination revealed that there were no bond defects in the resultant article and shear tests of the bond indicated strengths of approximately 28,000 p.s.i.

*Example II*

A brazed zirconium-thorium assembly made as in Example I was placed in a Ti-namel picture frame provided with an exhaust tube and two Ti-namel cover sheets were welded to the Ti-namel picture frame. Air was exhausted from the welded assembly and the exhaust tube was sealed by hot-forging. The resulting welded and exhausted assembly was hot-rolled at 760° C. to a final thickness of 0.065 inch. The rolled assembly was cooled and the outer enclosure was cut open. The rolled assembly was removed from the steel enclosure and a metallographic examination revealed that there were no bond defects in the rolled assembly, and shear tests of the bond indicated strengths of approximately 28,000 p.s.i.

*Example III*

A brazed zirconium-thorium assembly made as in Example I is placed in a zirconium picture frame and two zirconium cover plates each 0.25 inch thick are placed on the brazed assembly. The zirconium-clad brazed assembly is then placed in a Ti-namel picture frame provided with an exhaust tube and two Ti-namel cover sheets are welded to the Ti-namel picture frame. Air is exhausted from the welded assembly and the exhaust tube is sealed by hot-forging. The resulting welded and exhausted assembly is hot-rolled at 800° C. until reduced to a final thickness of 0.1 inch. The rolled assembly is cooled and the outer enclosure is cut open. The zirconium-clad brazed assembly is removed from the steel enclosure. A metallographic examination reveals no bond defects in the resulting assembly.

Thorium articles protected in the manner described herein are suitable for use in any high temperature application including neutronic reactors. Thorium, having any geometric shape can be clad by my technique and placed in any existing neutronic reactor, thereby providing for the production of U-233 by the interaction of Th-232 with neutrons.

The above description of one manner in which my invention may be practiced is included for illustrative purposes only and should not be interpreted in a limiting sense. Since modifications and deviations from the illustrative example may be made within the scope of my invention, it is intended that it be limited only by the appended claims.

Having thus described my invention, I claim:

1. A method for cladding a thorium article with zirconium, which comprises applying to at least all major surfaces of said thorium article a thorium-zirconium alloy, covering said surfaces with sheet zirconium, heating the resultant assembled article in a vacuum to the melting point of said alloy to bond the zirconium sheets to said article, thereby forming a pre-cladding of zirconium, applying outer zirconium sheets to the resultant pre-clad article, and rolling the resultant assembly at elevated temperatures under a protective atmosphere to bond the outer zirconium sheets to the pre-cladding of zirconium.

2. The method of claim 1 wherein the concentration of thorium in said alloy is 70 to 80 weight percent.

3. The method of claim 1 wherein the concentration of thorium in said alloy is 78 weight percent.

4. The method of claim 1 wherein the alloy is applied in the form of a foil.

5. The method of claim 4 wherein the alloy foil has a thickness of 0.010 inch.

6. A method for cladding a thorium article with zirconium, which comprises applying to at least the major surfaces of said thorium article a thorium-zirconium alloy, covering said surfaces with sheet zirconium, heating the resultant assembly in a vacuum to the melting point of said alloy to bond the zirconium sheets to said article, thereby forming a pre-cladding of zirconium, applying outer zirconium sheets to the resultant pre-clad article, enclosing the resultant assembly in an evacuated steel rolling can, and rolling the canned assembly thus formed at elevated temperatures to bond the outer zirconum sheets to the pre-cladding of the zirconium.

7. The method of claim 6 wherein the rolling temperature is between 650–850° C.

8. The method of claim 6 wherein the concentration of thorium in said alloy is 70 to 80 weight percent.

9. The method of claim 6 wherein the concentration of thorium in said alloy is 78 weight percent.

10. The method of claim 9 wherein said alloy is applied in the form of a foil.

References Cited in the file of this patent

UNITED STATES PATENTS

| | | |
|---|---|---|
| 2,100,256 | Larson | Nov. 23, 1937 |
| 2,820,751 | Saller | Jan. 21, 1958 |
| 2,850,798 | Bowman | Sept. 9, 1958 |
| 2,857,663 | Beggs | Oct. 28, 1958 |

OTHER REFERENCES

United States Atomic Energy Report NMI-1191, September 20, 1957, pp. 7–9, Nuclear Metals, Inc., Cambridge, Mass.